US010861258B2

(12) United States Patent
Kim et al.

(10) Patent No.: US 10,861,258 B2
(45) Date of Patent: Dec. 8, 2020

(54) METHOD FOR PREVENTING DIAGNOSTIC ERRORS IN VEHICLE NETWORK AND APPARATUS THEREFOR

(71) Applicants: HYUNDAI MOTOR COMPANY, Seoul (KR); KIA MOTORS CORPORATION, Seoul (KR)

(72) Inventors: Dong Ok Kim, Goyang-Si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 196 days.

(21) Appl. No.: 16/007,465

(22) Filed: Jun. 13, 2018

(65) Prior Publication Data

US 2018/0374286 A1    Dec. 27, 2018

(30) Foreign Application Priority Data

Jun. 23, 2017    (KR) .................. 10-2017-0079609

(51) Int. Cl.
*G07C 5/08* (2006.01)
*H04L 12/40* (2006.01)
*H04L 12/26* (2006.01)

(52) U.S. Cl.
CPC ............ *G07C 5/0808* (2013.01); *H04L 12/40* (2013.01); *H04L 43/50* (2013.01); *H04L 2012/40215* (2013.01); *H04L 2012/40273* (2013.01)

(58) Field of Classification Search
CPC ....... G07C 5/0808; H04L 43/50; H04L 12/40; H04L 2012/40215; H04L 2012/40273
See application file for complete search history.

(56) References Cited

U.S. PATENT DOCUMENTS 4,430,702 A  *  2/1984  Schiebe ............... G06F 12/14
                                                 709/220
4,625,308 A  *  11/1986  Kim .................... H04B 7/2123
                                                 370/321

(Continued)

FOREIGN PATENT DOCUMENTS

CN    101620442 A  *  1/2010  ............. F02D 41/22
CN    102307748 A  *  1/2012  ............. B60M 1/28

(Continued)

*Primary Examiner* — Behrang Badii
*Assistant Examiner* — Jalal C Coduroglu
(74) *Attorney, Agent, or Firm* — Morgan, Lewis & Bockius LLP

(57) ABSTRACT

A diagnostic method performed by a first communication node among a plurality of communication nodes in a vehicle network may include generating a diagnostic initiation message indicating that a first diagnostic procedure by an external diagnostic apparatus is to be performed upon detecting that the external diagnostic apparatus is connected to the first communication node; transmitting the diagnostic initiation message in a broadcast manner in the vehicle network; receiving a negative response message as a response to the diagnostic initiation message from a second communication node among the plurality of communication nodes, the negative response message indicating the second communication node operating as an internal diagnostic apparatus; and performing the first diagnostic procedure after a time indicated by the negative response message.

21 Claims, 8 Drawing Sheets

(56) References Cited

U.S. PATENT DOCUMENTS

| | | | | |
|---|---|---|---|---|
| 5,150,357 | A | * | 9/1992 | Hopner .................. H04Q 11/04 370/354 |
| 5,228,076 | A | * | 7/1993 | Hopner .............. H04Q 11/0407 379/388.02 |
| 5,331,642 | A | * | 7/1994 | Valley .................. H04L 1/0083 714/704 |
| 6,404,756 | B1 | * | 6/2002 | Whitehill ................ H04L 43/00 370/338 |
| 8,000,855 | B2 | * | 8/2011 | Bauerle ............. G05B 23/0237 701/33.6 |
| 8,442,793 | B2 | * | 5/2013 | Goodwin ............... G01D 5/145 702/116 |
| 8,577,672 | B2 | * | 11/2013 | Kinns ...................... H04L 1/20 704/201 |
| 8,832,502 | B2 | * | 9/2014 | Dusanapudi .......... G06F 11/263 714/33 |
| 9,450,911 | B2 | * | 9/2016 | Cha ..................... H04L 65/1069 |
| 9,954,851 | B2 | * | 4/2018 | Ahn .................... H04L 63/0823 |
| 10,007,263 | B1 | * | 6/2018 | Fields ................... B60W 30/09 |
| 2002/0009970 | A1 | * | 1/2002 | Asia ...................... H04W 24/00 455/3.03 |
| 2002/0098865 | A1 | * | 7/2002 | Jang ..................... H04W 76/20 455/557 |
| 2003/0079011 | A1 | * | 4/2003 | Schilling ................ H04L 43/50 709/224 |
| 2005/0108576 | A1 | * | 5/2005 | Munshi ............... H04L 63/0464 726/4 |
| 2005/0165326 | A1 | * | 7/2005 | Kirsner .............. A61B 10/0012 600/551 |
| 2006/0218884 | A1 | * | 10/2006 | Sperry ..................... B65B 9/02 53/450 |
| 2007/0061631 | A1 | * | 3/2007 | Nakamura .......... H04L 41/0663 714/43 |
| 2008/0046603 | A1 | * | 2/2008 | Kobayashi ............ G06F 11/364 710/17 |
| 2008/0188963 | A1 | * | 8/2008 | McCoy .............. H04L 12/2818 700/90 |
| 2009/0226057 | A1 | * | 9/2009 | Mashiach ................ G06T 5/002 382/128 |
| 2010/0002582 | A1 | * | 1/2010 | Luft .................. H04W 74/0866 370/230.1 |
| 2010/0110918 | A1 | * | 5/2010 | Mihaly ................... H04L 43/00 370/252 |
| 2010/0226295 | A1 | * | 9/2010 | Sun .................. H04W 74/0866 370/294 |
| 2010/0296454 | A1 | * | 11/2010 | Park ..................... H04L 1/1812 370/328 |
| 2010/0296481 | A1 | * | 11/2010 | Weniger ............ H04W 12/1204 370/331 |
| 2012/0124650 | A1 | * | 5/2012 | Boberg ............... G06F 21/6272 726/4 |
| 2012/0179797 | A1 | * | 7/2012 | Sharma ............... H04L 41/0806 709/223 |
| 2013/0287016 | A1 | * | 10/2013 | Stille ................... H04L 65/1069 370/352 |
| 2015/0229741 | A1 | * | 8/2015 | Kim ........................ H04L 67/12 370/467 |
| 2015/0239086 | A1 | * | 8/2015 | Lee ...................... B23D 59/001 83/58 |
| 2016/0057043 | A1 | * | 2/2016 | Osborne ................. H04L 43/10 370/248 |
| 2016/0096438 | A1 | * | 4/2016 | Grimes ................... B60L 53/18 320/109 |
| 2016/0140429 | A1 | * | 5/2016 | Glosser ............. G05B 23/0272 702/185 |
| 2016/0218884 | A1 | * | 7/2016 | Ebrom ................. H05B 1/0252 |
| 2016/0364247 | A1 | * | 12/2016 | Yun ...................... G06F 9/4418 |
| 2017/0012797 | A1 | * | 1/2017 | Mueller ................. H04L 12/12 |
| 2017/0019295 | A1 | * | 1/2017 | Kim ...................... H04L 12/40 |
| 2017/0026423 | A1 | * | 1/2017 | Merino Vazquez ......................... H04L 65/1016 |
| 2017/0104631 | A1 | * | 4/2017 | Chae .................... H04L 41/0823 |
| 2017/0126841 | A1 | * | 5/2017 | Bliss ..................... G06F 3/0481 |
| 2017/0153282 | A1 | * | 6/2017 | Du ....................... G01R 31/007 |
| 2017/0154480 | A1 | * | 6/2017 | Takahashi ......... B60W 50/0098 |
| 2017/0351251 | A1 | * | 12/2017 | Eeckhout ........... G05B 23/0283 |
| 2018/0374286 | A1 | * | 12/2018 | Kim ....................... H04L 43/50 |

FOREIGN PATENT DOCUMENTS

| | | | | |
|---|---|---|---|---|
| CN | 101620442 | B | * 9/2012 | ............. F02D 41/22 |
| CN | 102749583 | A | * 10/2012 | |
| CN | 103167054 | A | * 6/2013 | ......... H04L 41/0809 |
| CN | 104737134 | A | * 6/2015 | ............ G06F 11/263 |
| CN | 104852893 | A | * 8/2015 | ......... H04L 12/4625 |
| CN | 105774728 | A | * 7/2016 | |
| CN | 106254414 | A | * 12/2016 | ............. H04L 12/40 |
| DE | 102018114778 | A1 | * 12/2018 | ............. H04L 43/50 |
| EP | 3037906 | A1 | * 6/2016 | ........ G05B 23/0283 |
| JP | 2003345852 | A | * 12/2003 | |
| JP | 2011053805 | A | * 3/2011 | |
| JP | 2015154481 | A | * 8/2015 | ......... H04L 12/4625 |
| JP | 2017102633 | A | * 6/2017 | ........... G07C 5/0808 |
| KR | 20110059695 | A | * 6/2011 | |
| KR | 20140085133 | A | * 7/2014 | |
| KR | 101602069 | B1 | * 3/2016 | |
| WO | WO-2009109971 | A2 | * 9/2009 | ............. G06T 5/008 |
| WO | WO-2016102645 | A1 | * 6/2016 | ......... G05B 23/0283 |

* cited by examiner

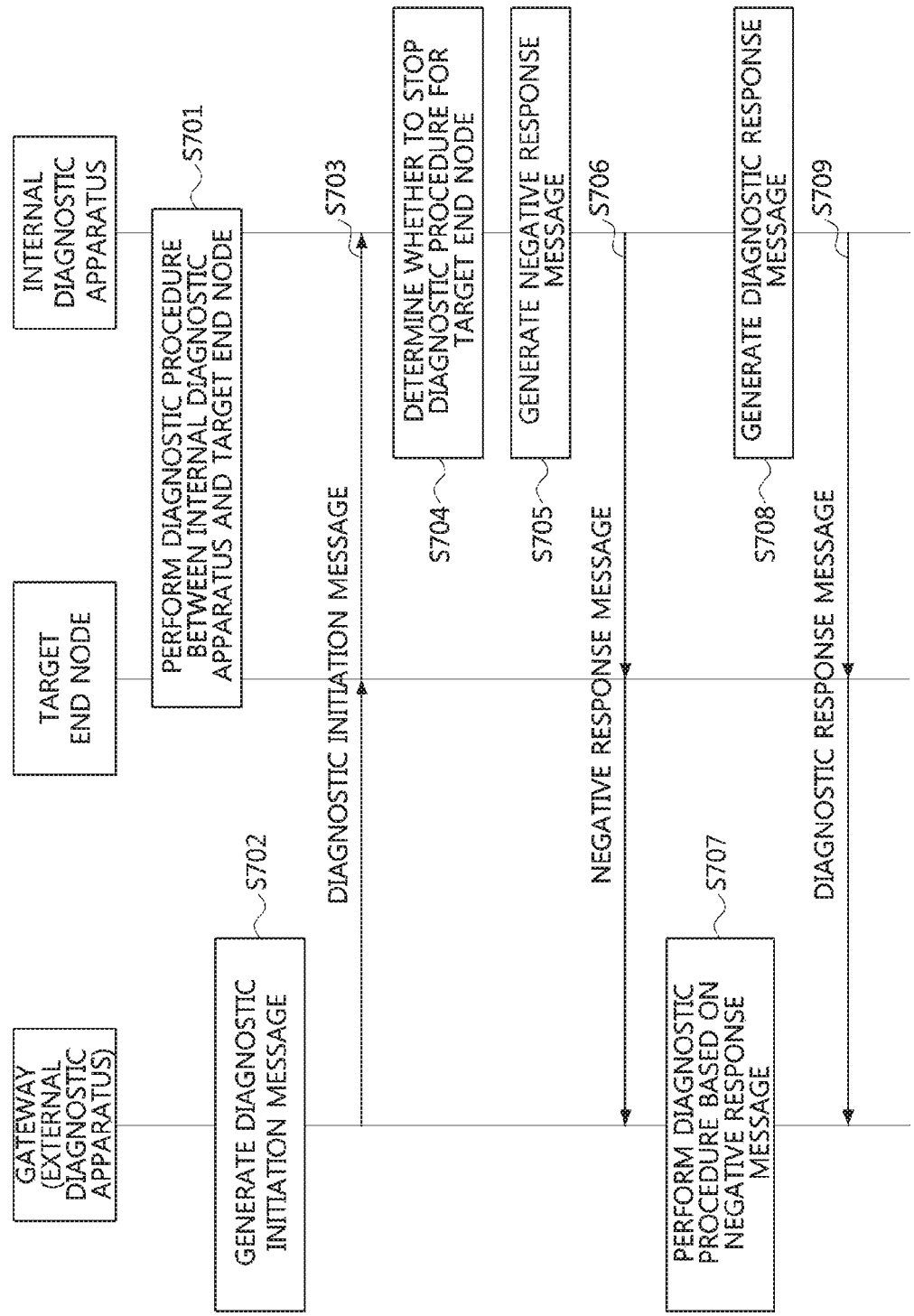

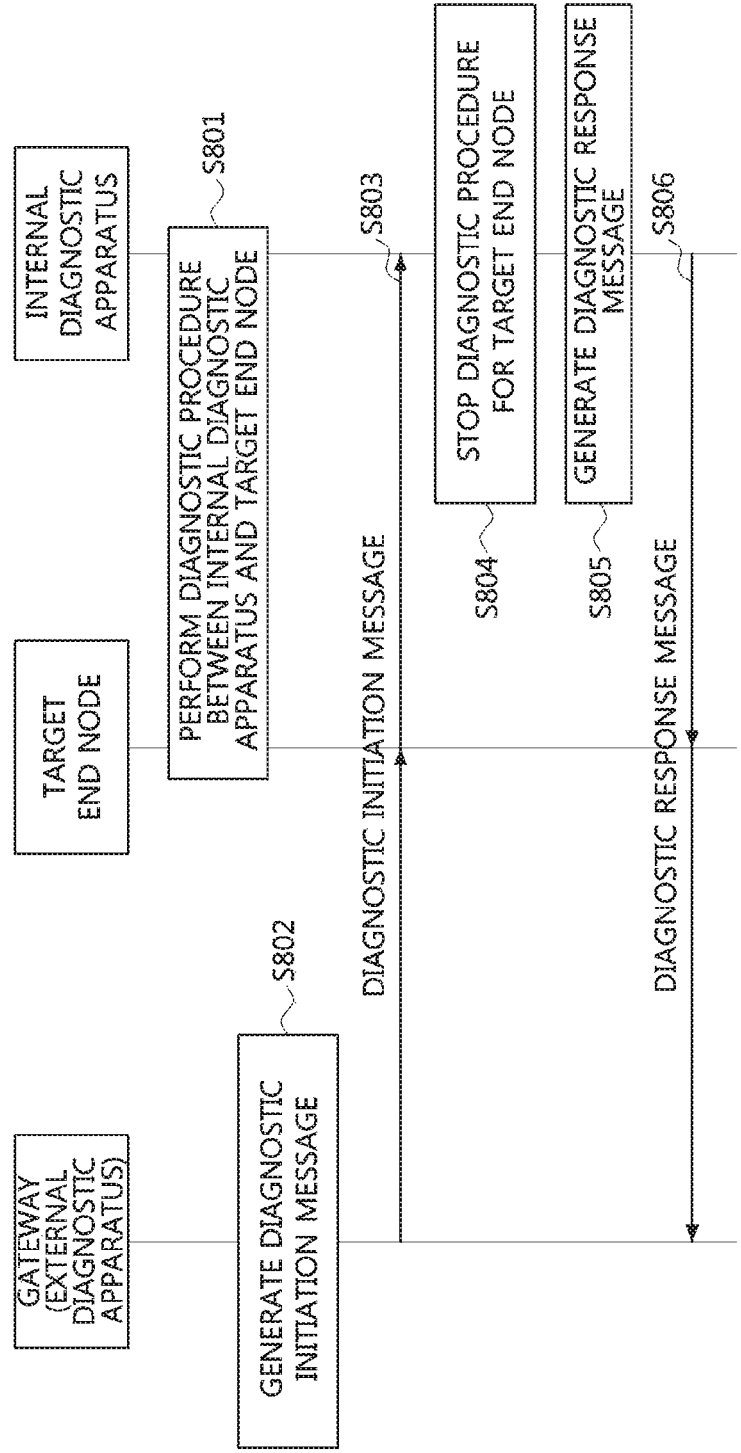

METHOD FOR PREVENTING DIAGNOSTIC ERRORS IN VEHICLE NETWORK AND APPARATUS THEREFOR

CROSS-REFERENCE TO RELATED APPLICATION

This application is based on and claims the benefit of priority to Korean Patent Application No. 10-2017-0079609 filed on Jun. 23, 2017 in the Korean Intellectual Property Office (KIPO), the entirety of which is incorporated by reference as if fully set forth herein.

TECHNICAL FIELD

The present disclosure relates to a vehicle network technology, and more specifically, to a method and an apparatus for preventing diagnostic errors due to a collision between a diagnostic procedure of an external diagnostic apparatus and a diagnostic procedure of an internal diagnostic apparatus in a vehicle network.

BACKGROUND

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The vehicle network described above may include a plurality of communication nodes (e.g., electronic devices), and diagnostic procedures for the plurality of communication nodes may be performed by an external diagnostic apparatus or an internal diagnostic apparatus. In case that a diagnostic procedure by the external diagnostic apparatus and a diagnostic procedure by the internal diagnostic apparatus are simultaneously performed for a target communication node in the vehicle network, a collision between the diagnostic procedures may occur. In this case, accurate diagnostic results cannot be obtained.

SUMMARY

The present disclosure provides a method of preventing a diagnostic error in a vehicle network, and an apparatus therefor.

In accordance with embodiments of the present disclosure, a diagnostic method performed by a first communication node in a vehicle network including a plurality of communication nodes may include transmitting, in a broadcast manner, a diagnostic initiation message indicating that a first diagnostic procedure by an external diagnostic apparatus is to be performed upon detecting that the external diagnostic apparatus is connected to the first communication node; and receiving a negative response message as a response to the diagnostic initiation message from a second communication node operating as an internal diagnostic apparatus, wherein the negative response message indicates that a second diagnostic procedure by the second communication node cannot be stopped.

The diagnostic method may further comprise performing the first diagnostic procedure after a time indicated by the negative response message.

The diagnostic initiation message may include an indicator indicating that the first diagnostic procedure is to be performed, at least one identifier of at least one communication node, among the plurality of communication nodes, for which the first diagnostic procedure is to be performed, and information indicating a start time of the first diagnostic procedure.

The negative response message may include an identifier of a third communication node, among the plurality of communication nodes, diagnosed through the second diagnostic procedure, and information indicating a remaining time until completion of the second diagnostic procedure.

The vehicle network may include an Ethernet-based vehicle network and a controller area network (CAN) based vehicle network, and the second communication node and the third communication node may belong to the Ethernet-based vehicle network.

The vehicle network may include an Ethernet-based vehicle network and a controller area network (CAN) based vehicle network, the negative response message may not be received when the second communication node belongs to the Ethernet-based vehicle network and the third communication node belongs to the CAN-based vehicle network, or when the second communication node belongs to the CAN-based vehicle network and the third communication node belongs to the Ethernet-based vehicle network or the CAN-based vehicle network, and the first diagnostic procedure may be performed when the negative response message is not received for a predetermined time.

The first diagnostic procedure may be performed after receiving a diagnostic response message indicating that the second diagnostic procedure of the second communication node is completed.

The diagnostic response message may include an identifier of a third communication node, among a plurality of communication node, diagnosed through the second diagnostic procedure, a type of the second diagnostic procedure, and a result of the second diagnostic procedure.

Further, in accordance with embodiments of the present disclosure, a diagnostic method performed by a first communication node, among a plurality of communication nodes, operating as an internal diagnostic apparatus in a vehicle network may comprise performing a first diagnostic procedure for a second communication node among the plurality of communication nodes; receiving a diagnostic initiation message indicating that a second diagnostic procedure by an external diagnostic apparatus is to be performed from a third communication node, to which the external diagnostic apparatus is connected, among the plurality of communication nodes; determining whether to stop the first diagnostic procedure based on the diagnostic initiation message; and in response to a determination that the first diagnostic procedure cannot be stopped, transmitting a negative response message indicating that the first diagnostic procedure cannot be stopped.

The diagnostic initiation message may include an indicator indicating that the second diagnostic procedure is to be performed, at least one identifier of at least one communication node, among the plurality of communication nodes, diagnosed through the second diagnostic procedure, and information indicating a start time of the second diagnostic procedure.

The first diagnostic procedure may be performed regardless of the second diagnostic procedure in response to a determination that an identifier of the second communication node is different from the at least one identifier included in the diagnostic initiation message, and the negative response message may be transmitted in response to a determination that the identifier of the second communication node is identical to the at least one identifier included in the diagnostic initiation message and the first diagnostic procedure cannot be stopped.

The first diagnostic procedure may be performed regardless of the second diagnostic procedure in response to a determination that a completion time of the first diagnostic procedure is before the start time of the second diagnostic procedure indicated by the diagnostic initiation message, and the negative response message may be transmitted in response to a determination that the completion time of the first diagnostic procedure is after the start time of the second diagnostic procedure indicated by the diagnostic initiation message and the first diagnostic procedure cannot be stopped.

The negative response message may include an identifier of the second communication node diagnosed through the first diagnostic procedure, and information indicating a remaining time until completion of the first diagnostic procedure.

The vehicle network may include an Ethernet-based vehicle network and a controller area network (CAN) based vehicle network, and the first communication node and the second communication node may belong to the Ethernet-based vehicle network.

The diagnostic method may further comprise transmitting a diagnostic response message indicating that the first diagnostic procedure is completed when the first diagnostic procedure is completed.

Further, in accordance with embodiments of the present disclosure, a first communication node, among a plurality of communication nodes in a vehicle network, operating as an internal diagnostic apparatus, may include a processor and a non-transitory computer readable medium storing at least one instruction executed by the processor. The at least one instruction executed by the processor may cause the processor to: perform a first diagnostic procedure for a second communication node among the plurality of communication nodes; receive a diagnostic initiation message indicating that a second diagnostic procedure by an external diagnostic apparatus is to be performed from a third communication node, to which the external diagnostic apparatus is connected, among the plurality of communication nodes; determine whether to stop the first diagnostic procedure based on the diagnostic initiation message; and in response to a determination that the first diagnostic procedure cannot be stopped, transmit a negative response message indicating that the first diagnostic procedure cannot be stopped.

The diagnostic initiation message may include an indicator indicating that the second diagnostic procedure is to be performed, at least one identifier of at least one communication node, among the plurality of communication nodes, diagnosed through the second diagnostic procedure, and information indicating a start time of the second diagnostic procedure.

The at least one instruction executed by the processor may cause the processor to perform first diagnostic procedure regardless of the second diagnostic procedure in response to a determination that an identifier of the second communication node is different from the at least one identifier included in the diagnostic initiation message.

The first diagnostic procedure may be performed regardless of the second diagnostic procedure when a completion time of the first diagnostic procedure is before the start time of the second diagnostic procedure indicated by the diagnostic initiation message.

The negative response message may include an identifier of the second communication node diagnosed through the first diagnostic procedure, and information indicating a remaining time until completion of the first diagnostic procedure.

The vehicle network may include an Ethernet-based vehicle network and a controller area network (CAN) based vehicle network, and the first communication node and the second communication node may belong to the Ethernet-based vehicle network.

According to embodiments of the present disclosure, when both of an internal diagnostic apparatus and an external diagnostic apparatus exist for a vehicle network, the internal diagnostic apparatus may perform a diagnostic procedure for a target communication node, and receive a diagnostic initiation message from the external diagnostic apparatus while performing the diagnostic procedure for the target communication node. In this case, the internal diagnostic apparatus may stop its diagnostic procedure for the target communication node. Therefore, a collision between the diagnostic procedures of the internal diagnostic apparatus and the external diagnostic apparatus can be prevented.

However, in case that the diagnostic procedure for the target communication node cannot be stopped, the internal diagnostic apparatus may transmit a negative response message indicating that the corresponding diagnostic procedure cannot be stopped. The external diagnostic apparatus may receive the negative response message from the internal diagnostic apparatus, and may not perform its diagnostic procedure for the target communication node for a time period indicated by the received negative response message. Accordingly, a collision between the diagnostic procedures of the internal diagnostic apparatus and the external diagnostic apparatus can be prevented.

BRIEF DESCRIPTION OF DRAWINGS

Embodiments of the present disclosure will become more apparent by describing in detail forms of the present disclosure with reference to the accompanying drawings, in which:

FIG. 7 is a flowchart for explaining a first embodiment of a method performed in the vehicle network shown in FIG. 6 to avoid a collision between diagnostic procedures; and FIG. 8 is a flowchart for explaining a second embodiment of a method performed in the vehicle network shown in FIG. 6 to avoid a collision between diagnostic procedures.

Figure 1:
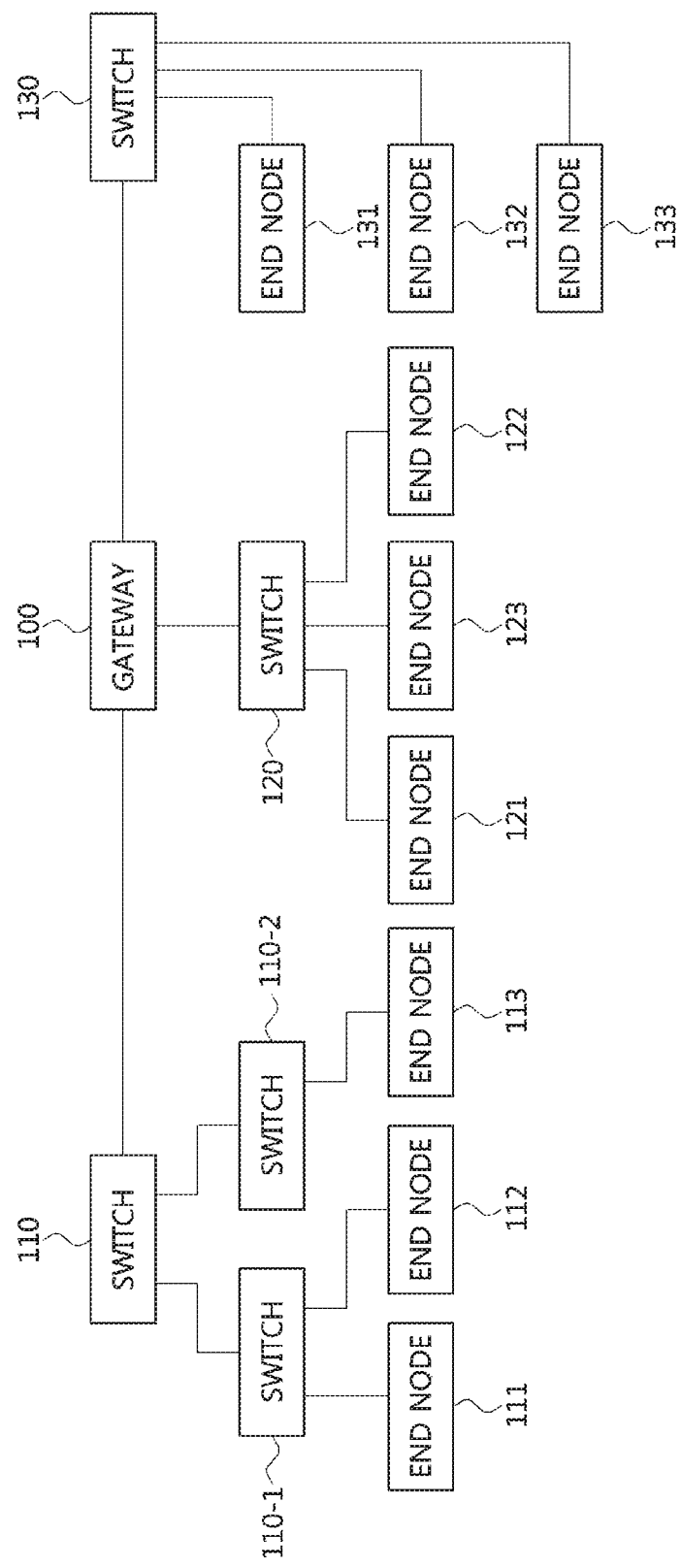
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion vehicles, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. Embodiments according to the present disclosure may be applied to the network topologies described above, and the network topology to which the embodiments according to the present disclosure are applied is not limited to these, and may be variously configured.

Figure 2:
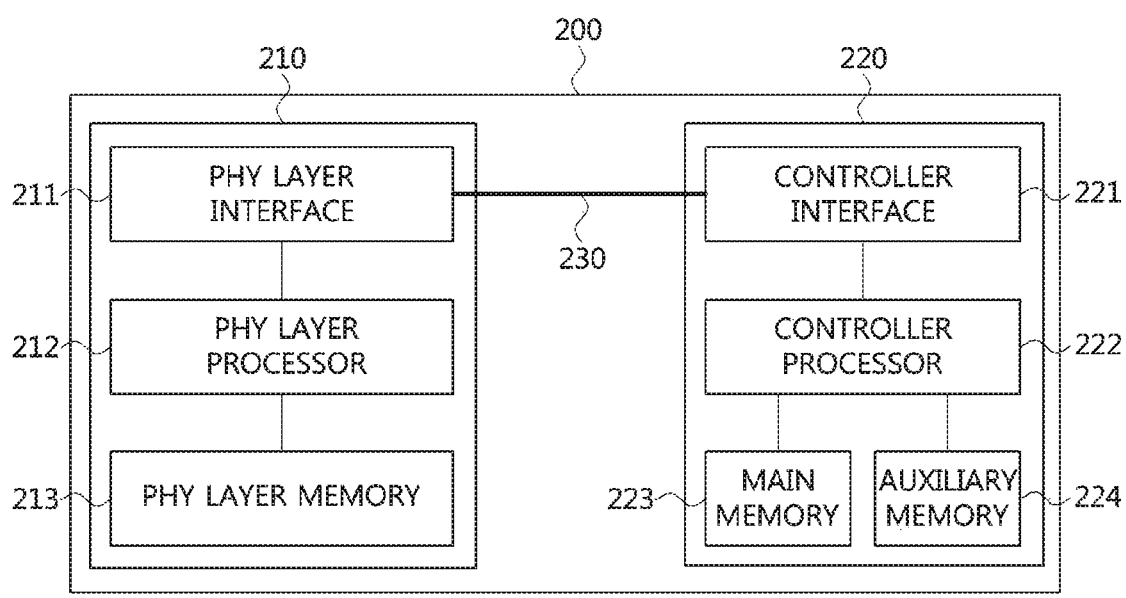
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), and a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Meanwhile, the PHY layer 210 (i.e., the PHY layer processor 212) may be in a sleep mode, a normal mode (e.g., an active mode), or the like. The PHY layer 210 may transition from the sleep mode to the normal mode and transition from the normal mode to the sleep mode based on the control of the controller processor 222. The controller 220 (i.e., the controller processor 222) may be in a power-off mode, a sleep mode, a normal mode, or the like. The controller 220 may transition from the power-off mode to the sleep mode or the normal mode, transition from the sleep mode to the power-off mode or the normal mode, and transition from the normal mode to the power-off mode or to the sleep mode.

Here, the power-off mode may mean a state in which power is not supplied to the corresponding entity (e.g., the controller 220, etc.). The sleep mode may mean a state (i.e., a power saving state) in which a minimum amount of power is supplied to the corresponding entity (e.g., the PHY layer 210, the controller 220, etc.) for basic operation. The normal mode may mean a state (i.e., wake-up state) in which power is normally supplied to the corresponding entity (e.g., PHY layer 210, controller 220, etc.).

Meanwhile, the communication node 200 illustrated in FIG. 2 may be configured as follows.

Figure 3:
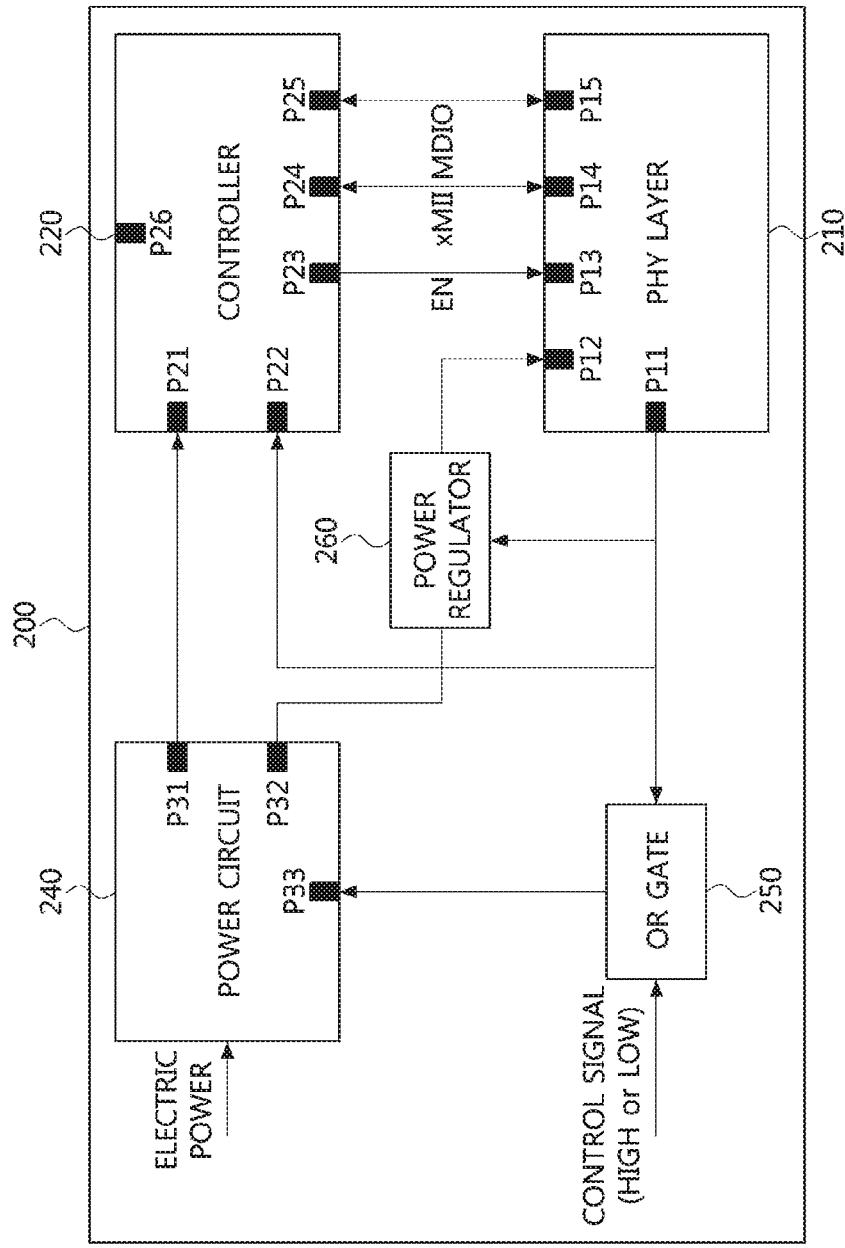
FIG. 3 is a block diagram illustrating a second embodiment of a communication node belonging to a vehicle network.

FIG. 3 is a block diagram illustrating a second embodiment of a communication node belonging to a vehicle network.

Referring to FIG. 3, the communication node 200 may comprise the PHY layer 210, the controller 220, a power circuit 240, an OR gate 250, a power regulator 260, and the like. Each of the PHY layer 210 and the controller 220 shown in FIG. 3 may be the same as or similar to the PHY layer 210 and the controller 220 shown in FIG. 2.

The PHY layer 210 may include a plurality of pins (e.g., P11, P12, P13, P14, and P15). The PHY layer 210 may output a signal for instructing power supply, a signal for instructing power-off, etc. through P11. For example, a HIGH signal output through P11 of the PHY layer 210 may indicate the power being supplied, and a LOW signal output through P11 of the PHY layer 210 may indicate the power-off. The P11 of the PHY layer 210 may denote an inhibit (INH) pin.

Alternatively, the PHY layer 210 may output an interrupt signal via P11. For example, a HIGH signal output through P11 of the PHY layer 210 may mean an interrupt signal, and the interrupt signal may be received at P22 of the controller 220. The interrupt signal may instruct transition from the sleep mode to the normal mode. Here, the P11 may denote an interrupt pin.

Electric power may be supplied from the power circuit 240 through P12 of the PHY layer 210. The PHY layer 210 may receive a signal instructing a transition from the sleep mode to the normal mode, a signal instructing a transition from the normal mode to the sleep mode, and the like via P13. For example, a HIGH signal input through P13 of the PHY layer 210 may instruct the transition from the sleep mode to the normal mode, and a LOW signal input through P13 of the PHY layer 210 may instruct the transition from the normal mode to the sleep mode. The P13 of the PHY layer 210 may denote an enable (EN) pin.

The P14 of PHY layer 210 may be used for xMII and the P15 of PHY layer 210 may be used for a management data input/output (MDIO) interface. For example, the PHY layer 210 may transmit and receive signals (e.g., Ethernet related signals) with the controller 220 using P14 and P15. The setting of each of the plurality of pins included in the PHY layer 210 is not limited to that described above, and each of the plurality of pins included in the PHY layer 210 may be variously configured.

The controller 220 may include a plurality of pins (e.g., P21, P22, P23, P24, P25, and P26). Electric power may be supplied from the power circuit 240 via P21 of the controller 220. The controller 220 may receive an interrupt signal via P22. For example, a HIGH signal input through P22 of the controller 220 may mean an interrupt signal. The controller 220 may transition from the sleep mode to the normal mode upon receiving the interrupt signal. The P22 of the controller 220 may denote an interrupt pin.

The controller 220 may output a signal instructing a transition from the sleep mode to the normal mode, a signal instructing a transition from the normal mode to the sleep mode, and the like via P23. For example, a HIGH signal output through P23 of the controller 220 may instruct the transition from the sleep mode to the normal mode, and a LOW signal output through the P23 of the controller 220 may instruct the transition from the normal mode to the sleep mode. The P23 of the controller 220 may denote the EN pin.

The P24 of the controller 220 may be used for xMII and the P25 of the controller 220 may be used for the MDIO interface. For example, the controller 220 may transmit and receive signals (e.g., Ethernet related signals) with the PHY layer 210 using P24 and P25. The controller 220 may detect a local wake-up signal (e.g., a local event) via P26. For example, a HGH signal input through P26 of the controller 220 may indicate a local wake-up signal. The P26 of the controller 220 may denote a WAKE pin. The setting of each of the plurality of pins included in the controller 220 is not limited to that described above, and each of the plurality of pins included in the controller 220 may be variously configured.

The power circuit 240 may include a plurality of pins (e.g., P31, P32, and P33). The power circuit 240 may receive a signal for instructing power supply, a signal for instructing power-off, and the like through P33. For example, a HIGH signal input via P33 of the power circuit 240 may indicate the power being supplied, and a LOW signal input from P33 of the power circuit 240 may indicate the power-off. The power circuit 240 may supply power based on the signal input through P33. For example, the power circuit 240 may supply power to the controller 220 via P31 and power to the PHY layer 210 via P32. The setting of each of the plurality of pins included in the power circuit 240 is not limited to that described above, and each of the plurality of pins included in the power circuit 240 may be variously configured.

The OR gate 250 may receive a control signal (e.g., a HIGH signal or a LOW signal) from an arbitrary entity (e.g., the controller 220), and a control signal (e.g., a HIGH signal or a LOW signal) from the PHY layer 210. The OR gate 250 may perform an OR operation on the control signals received from the arbitrary entity and the PHY layer 210, and may output a result of the OR operation. The result of the OR operation may be input to P33 of the power circuit 240.

An input end of the power regulator 260 may be connected to P32 of the power circuit 240 and an output end of the power regulator 260 may be connected to P12 of the PHY layer 210. When a voltage of the power supplied from the power circuit 240 exceeds a predetermined threshold value (e.g., 3.3 V), the power regulator 260 may regulate the voltage of the supplied power to the predetermined threshold value or less, and supply power having the regulated voltage to the PHY layer 210.

Meanwhile, a protocol structure of the communication node shown in FIG. 1 to FIG. 3 may be as follows.

Figure 4:
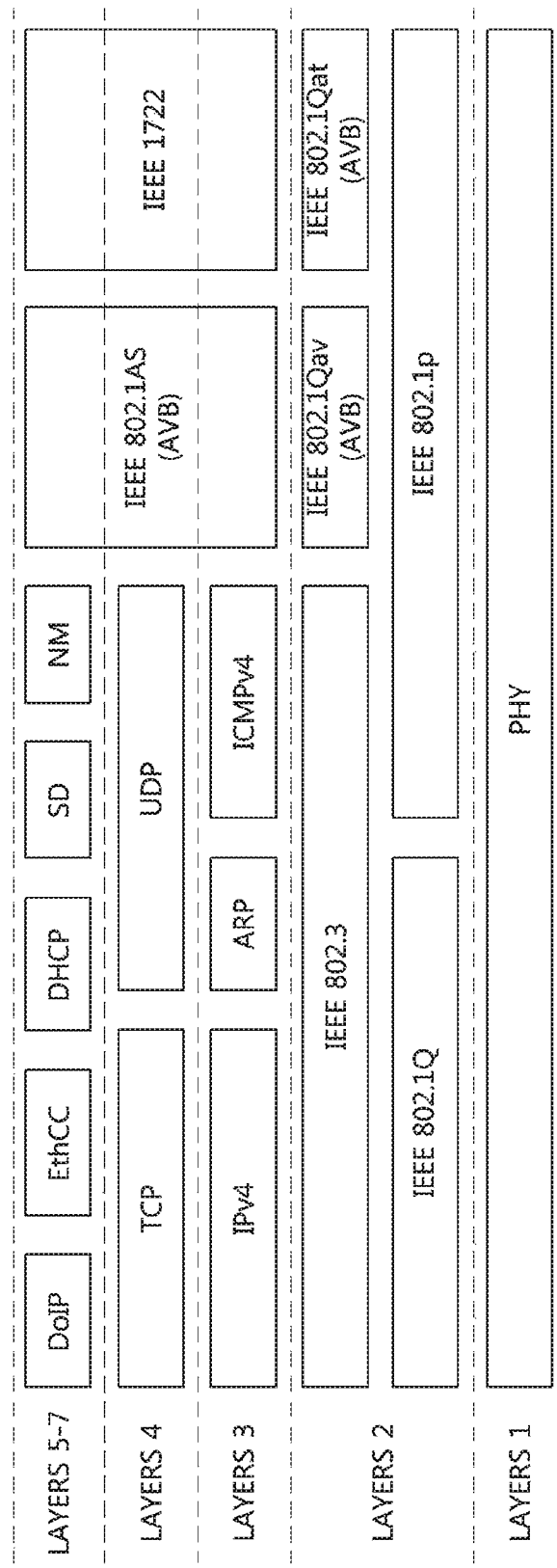
FIG. 4 is a block diagram illustrating a first embodiment of a protocol structure of a communication node constituting a vehicle network.

FIG. 4 is a block diagram illustrating a first embodiment of a protocol structure of a communication node constituting a vehicle network.

Referring to FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

In the following description, methods for preventing diagnostic errors in a vehicle network will be described. Hereinafter, even when a method (e.g., transmission or reception of a signal) to be performed at the first communication node is described, the corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 5:
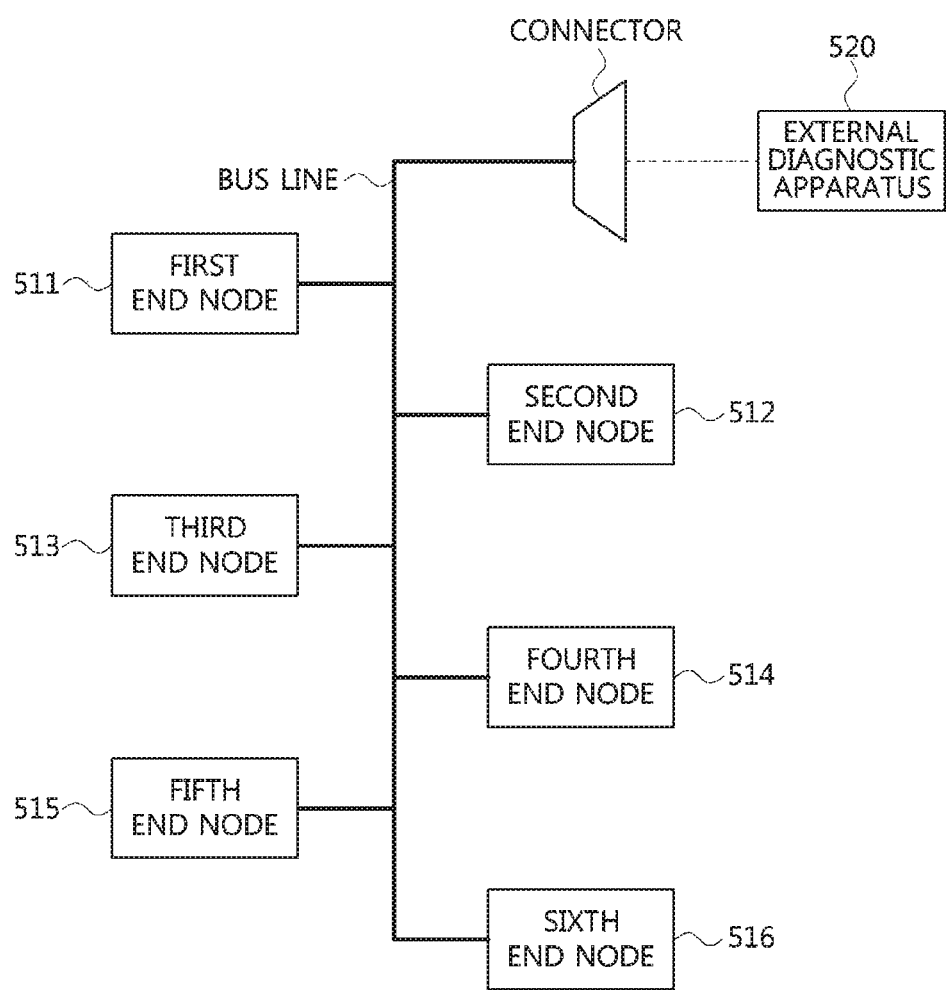
FIG. 5 is a block diagram illustrating a second embodiment of a vehicle network topology.

FIG. 5 is a block diagram illustrating a second embodiment of a vehicle network topology.

Referring to FIG. 5, a CAN-based vehicle network may include a plurality of end nodes 511 to 516. In the CAN-based vehicle network, the plurality of end nodes 511 to 516 may be interconnected via a bus line. That is, communications between the plurality of end nodes 511 to 516 may be performed through the bus line.

Meanwhile, an external diagnostic apparatus 520 may be connected to the CAN-based vehicle network by a connector, and perform diagnostic procedures for the plurality of end nodes 511 to 516 belonging to the CAN-based vehicle network. Also, in case that the sixth end node 516 supports a diagnostic function, the sixth end node 516 may perform diagnostic procedures for the other end nodes 511 to 515 in the CAN based vehicle network. In this case, the sixth end node 516, which supports the diagnostic function, may be referred to as an 'internal diagnostic apparatus'. Here, each of the internal diagnostic apparatus (e.g., the sixth end node 516) and the external diagnostic apparatus 520 may be an on-board diagnostics (OBD) apparatus. The diagnostic procedure performed by the internal diagnostic apparatus may be the same as or similar to the diagnostic procedure performed by the external diagnostic apparatus 520. Alternatively, the diagnostic procedure performed by the internal diagnostic apparatus may be different from the diagnostic procedure of the external diagnostic apparatus 520.

In case that the internal diagnostic apparatus and the external diagnostic apparatus 520 simultaneously perform the diagnostic procedures, a diagnosis result may not be accurate due to a collision between the diagnostic procedures. However, since the communication path (i.e., the bus line) in the CAN-based vehicle network is shared by all of the end nodes 511 to 516, the internal diagnostic apparatus may confirm that the diagnostic procedure is being performed by the external diagnostic apparatus 520 by receiving a diagnosis related message (e.g., a diagnosis request message) from the external diagnostic apparatus 520. For example, the internal diagnostic apparatus may perform a monitoring operation on the diagnosis related message of the external diagnostic apparatus 520 before performing the diagnostic procedure of the internal diagnostic apparatus in order to confirm whether the external diagnostic apparatus 520 performs the diagnostic procedure. The internal diagnostic apparatus which has confirmed that the diagnostic procedure is performed by the external diagnostic apparatus 520 may not perform its diagnostic procedure. Therefore, the diagnostic procedure of the external diagnostic apparatus 520 may not conflict with the diagnostic procedure of the internal diagnostic apparatus.

However, in the Ethernet-based vehicle network (e.g., the vehicle network illustrated in FIG. 1), the communication path is not shared between end nodes belonging to the vehicle network, so that the diagnostic procedure of the internal diagnostic apparatus may conflict with the diagnostic procedure of the external diagnostic apparatus. For example, when the diagnostic procedure of the internal diagnostic apparatus and the diagnostic procedure of the external diagnostic apparatus are performed simultaneously in the Ethernet-based vehicle network, a diagnosis related message (e.g., a diagnosis request message) of the internal diagnostic apparatus may not be received at the external diagnostic apparatus, and a diagnostic-related message (e.g., a diagnosis request message) of the external diagnostic apparatus may not be received at the internal diagnostic apparatus. Therefore, the internal diagnostic apparatus may not confirm whether the external diagnostic apparatus performs the diagnostic procedure, and the external diagnostic apparatus may not confirm whether the internal diagnostic apparatus performs the diagnostic procedure. For this reason, the diagnostic procedure by the internal diagnostic apparatus may conflict with the diagnostic procedure by the external diagnostic apparatus.

In order to prevent the collision between the diagnostic procedures of the internal diagnostic apparatus and the external diagnostic apparatus in the Ethernet-based vehicle network, the diagnostic procedure of the internal diagnostic apparatus may be performed after a predetermined time (e.g., 10 seconds) from a start of the vehicle. However, even when an external diagnostic apparatus is not connected to the Ethernet-based vehicle network, both the diagnostic procedures of the internal diagnostic apparatus and the external diagnostic apparatus may not be performed from the start of the vehicle to the predetermined time. In this case, problems of the vehicle occurring from the start of the vehicle to the predetermined time may not be detected, and thus serious problems may occur during the running of the vehicle.

Also, each of the internal diagnostic apparatus and the external diagnostic apparatus may perform a software update function for a communication node (e.g., an end node) in the Ethernet-based vehicle network. However, if the diagnostic procedure of the external diagnostic apparatus is detected during the software update by the internal diagnostic apparatus, the internal diagnostic apparatus should stop the software update, so that an error of the software update may occur. For example, since an error verification operation of the updated software is performed after an operation of transitioning from 'ignition OFF state' to 'ignition ON state' at a final stage of the software update procedure, if the software update procedure is stopped before completion of the software update, it may be difficult to detect the error. Since the internal diagnostic apparatus cannot know a time at which the diagnostic procedure of the external diagnostic apparatus is to be performed (or, a time at which the external diagnostic apparatus is to be connected to the Ethernet-based vehicle network), the software update procedure by the internal diagnostic apparatus may be prohibited in the Ethernet-based vehicle network.

Figure 6:
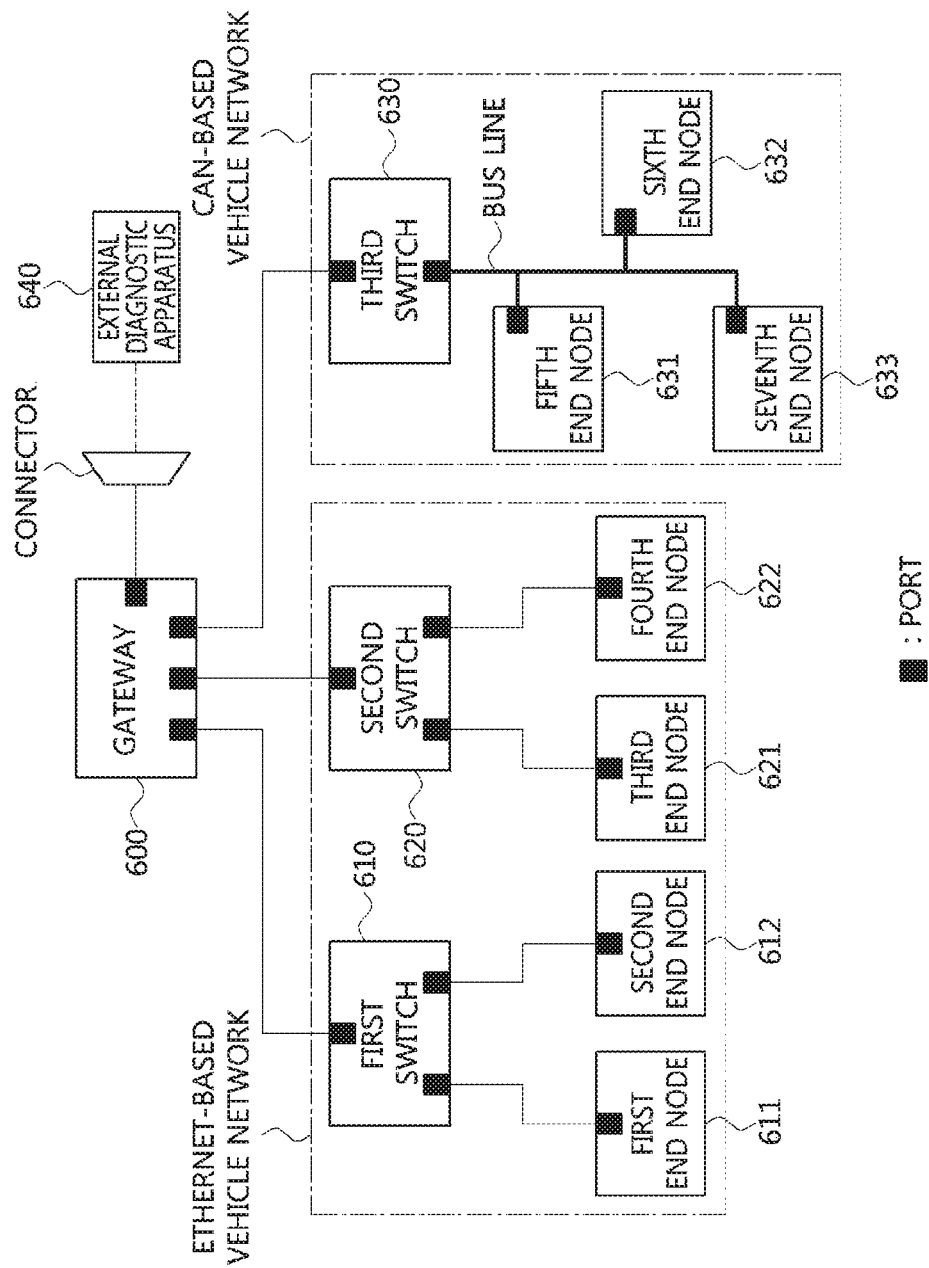
FIG. 6 is a block diagram illustrating a third embodiment of a vehicle network topology.

FIG. 6 is a block diagram illustrating a third embodiment of a vehicle network topology.

Referring to FIG. 6, a vehicle network may include a gateway 600, switches 610, 620, and 630, end nodes 611, 612, 621, 622, 631, 632, and 633, and the like. The communication nodes 600, 610, 611, 612, 620, 621, 622, 630, 631, 632, and 633 belonging to the vehicle network may have the same or similar configuration as the communication node 200 shown in FIGS. 2 and 3, and may have the same or similar protocol structure as the protocol structure shown in FIG. 4.

The vehicle network may include an Ethernet-based vehicle network and a CAN-based vehicle network. The Ethernet-based vehicle network may include a first switch 610, a second switch 620, a first end node 611, a second end node 612, a third end node 621, a fourth end node 622, and the like. The first end node 611 and the second end node 612 may be connected to the first switch 610, and the third end node 621 and the fourth end node 622 may be connected to the second switch 620. The CAN-based vehicle network may include a third switch 630, a fifth end node 631, a sixth end node 632, a seventh end node 633, and the like. The fifth end node 631, the sixth end node 632, and the seventh end node 633 may be connected to the third switch 630 via a bus line.

The gateway 600 may support communications between the Ethernet-based vehicle network and the CAN-based vehicle network. For example, the gateway 600 may be connected to the first switch 610 and the second switch 620 belonging to the Ethernet-based vehicle network, and may also be connected to the third switch 630 belonging to the CAN-based vehicle network.

The diagnostic procedure for the communication nodes belonging to the vehicle network may be performed by an external diagnostic apparatus 640 or an internal diagnostic apparatus. Each of the external diagnostic apparatus and the internal diagnostic apparatus may be an OBD apparatus. The external diagnostic apparatus 640 may be connected to the gateway 600 via a connector and may perform diagnostic procedures for the communication nodes after being connected to the gateway 600. The internal diagnostic apparatus may be an end node that performs diagnostic functions among the end nodes 611, 612, 621, 622, 631, 632, and 633 belonging to the vehicle network. For example, at least one of the end nodes 611, 612, 621, and 622 belonging to the Ethernet-based vehicle network may be the internal diagnostic apparatus. Alternatively, at least one of the end nodes 631, 632, and 633 belonging to the CAN-based vehicle network may be the internal diagnostic apparatus.

The external diagnostic apparatus 640 or the internal diagnostic apparatus may perform diagnostic procedures for the at least one end node, and the end node diagnosed by the external diagnostic apparatus 640 or the internal diagnostic apparatus may be referred to as a 'target end node'. In case that the external diagnostic apparatus 640 is connected to the gateway 600, the diagnostic procedure of the internal diagnostic apparatus may conflict with the diagnostic procedure of the external diagnostic apparatus 640. Hereinafter, methods for preventing a collision between the diagnostic procedure of the internal diagnostic apparatus and the diagnostic procedure of the external diagnostic apparatus 640 will be described. The method of preventing a collision of diagnostic procedures may vary depending on the type of vehicle network to which each of the internal diagnostic apparatus and the target end node belongs (e.g., Ethernet-based vehicle network or CAN-based vehicle network). That is, different methods to prevent a collision between diagnostic procedures may be applied to each of scenarios described in Table 1 below.

TABLE 1

| | Location of internal diagnostic apparatus | Location of target end node |
|---|---|---|
| Scenario 1 | Ethernet-based vehicle network | Ethernet-based vehicle network |
| Scenario 2 | Ethernet-based vehicle network | CAN-based vehicle network |
| Scenario 3 | CAN-based vehicle network | Ethernet-based vehicle network |
| Scenario 4 | CAN-based vehicle network | CAN-based vehicle network |

A method illustrated in FIG. 7 to prevent a collision between diagnostic procedures may be applied to Scenario 1, another method illustrated in FIG. 8 to prevent a collision between diagnostic procedures may be applied to Scenario 2, the method illustrated in FIG. 7 or 8 may be applied to Scenario 3, and the method illustrated in FIG. 8 may be applied to Scenario 4.

FIG. 7 is a flowchart for explaining a first embodiment of a method performed in the vehicle network shown in FIG. 6 to prevent a collision between diagnostic procedures.

Referring to FIG. 7, a gateway may be the gateway 600 shown in FIG. 6, and a target end node may be one of the end nodes 611, 612, 621, and 622 belonging to the Ethernet-based vehicle network shown in FIG. 6, and an internal diagnostic apparatus may be an end node other than the end node set as the target end node among the end nodes 611, 612, 621, and 622 belonging to the Ethernet-based vehicle network shown in FIG. 6. Alternatively, the internal diagnostic apparatus may be one of the end nodes 631, 632, and 633 belonging to the CAN-based vehicle network shown in FIG. 6. For example, the target end node may be the first end node 611 and the internal diagnostic apparatus may be the fourth end node 622 or the fifth end node 631.

The internal diagnostic apparatus may perform a diagnostic procedure for the target end node (S701). The external diagnostic apparatus may be connected to the gateway while the diagnostic procedure is performed between the internal diagnostic apparatus and the target end node. In this case, the gateway (or, the external diagnostic apparatus) may generate a diagnostic initiation message indicating that a diagnostic procedure by the external diagnostic apparatus is to be performed (S702). The diagnostic initiation message may include at least one information element among information elements listed in Table 2 below.

TABLE 2

| Information Element | Description |
| --- | --- |
| Diagnostic initiation indicator | indicates that a diagnostic procedure by the external diagnostic apparatus is to be performed. |
| Identifier | indicates an identifier of the target end node to be diagnosed by the external diagnostic apparatus. For example, the diagnostic initiation message may include at least one identifier of at least one target end node. Alternatively, an identifier included in the diagnostic initiation message may indicate all of end nodes belonging to the vehicle network. |
| Diagnostic type | indicates the type of the diagnostic procedure (e.g., software update procedure, etc.) to be performed by the external diagnostic apparatus. |
| Diagnostic time | indicates performance time (e.g., a start time or duration) of the diagnostic procedure to be performed by the external diagnostic apparatus. |

The gateway may transmit the diagnostic initiation message in a broadcast manner (S703). The diagnostic initiation message may thus be transmitted to all the communication nodes belonging to the vehicle network. The internal diagnostic apparatus may receive the diagnostic initiation message and confirm that the diagnostic procedure of the external diagnostic apparatus is to be performed based on the received diagnostic initiation message. Also, the internal diagnostic apparatus may determine whether to stop a diagnostic procedure performed by the internal diagnostic apparatus for the target end node (S704). The step S704 may be performed according to the type of the information element included in the diagnostic initiation message.

1) A case that the diagnostic initiation message indicates that the diagnostic procedure of the external diagnostic apparatus is to be performed Upon receiving the diagnostic initiation message, the internal diagnostic apparatus may stop its diagnostic procedure for the target end node when it is possible to stop its diagnostic procedure for the target end node. On the other hand, if it is impossible to stop its diagnostic procedure for the target end node, the internal diagnostic apparatus may generate a negative response message indicating that it is impossible to stop the diagnostic procedure of the internal diagnostic apparatus (S705). For example, the internal diagnostic apparatus may determine that it is impossible to stop the diagnostic procedure for the target end node when a software update procedure for the target end node is performed. The negative response message may include at least one information element among information elements listed in Table 3 below.

The internal diagnostic apparatus may transmit the negative response message (S706). The negative response message may be transmitted in a broadcast manner, and may be transmitted periodically until completion of the diagnostic procedure performed by the internal diagnostic apparatus. The gateway (or, the external diagnostic apparatus) may receive the negative response message, and the diagnostic procedure of the external diagnostic apparatus may be performed in consideration of the information elements included in the negative response message (S707). For example, the external diagnostic apparatus may perform diagnostic procedures for end nodes other than the target end node indicated by the identifier included in the negative response message. Alternatively, the external diagnostic apparatus may perform the diagnostic procedure after a time indicated by the remaining time included in the negative response message. Alternatively, the external diagnostic apparatus may not perform the diagnostic procedure if the negative response message is received, and may perform the diagnostic procedure if the negative response message is not received for a predetermined time.

On the other hand, if the diagnostic procedure for the target end node is stopped or the diagnostic procedure for the target end node is completed, the internal diagnostic apparatus may generate a diagnostic response message (S708). The diagnostic response message may indicate that the diagnostic procedure by the internal diagnostic apparatus is stopped or that the diagnostic procedure by the internal diagnostic apparatus is completed. The diagnostic response message may include at least one information element among information elements listed in Table 4 below.

TABLE 3

| Information Element | Description |
| --- | --- |
| Identifier | indicates an identifier of the target end node diagnosed by the internal diagnostic apparatus. |
| Diagnostic type | indicates the type of the diagnostic procedure (e.g., software update procedure, etc.) performed by the internal diagnostic apparatus. |
| Remaining time | indicates a remaining time until completion of the diagnostic procedure performed by the internal diagnostic apparatus, or a completion time of the diagnostic procedure performed by the internal diagnostic apparatus. |

TABLE 4

| Information Element | Description |
| --- | --- |
| Identifier | indicates an identifier of the target end node diagnosed by the internal diagnostic apparatus. |
| Diagnostic type | indicates the type of the diagnostic procedure (e.g., software update procedure, etc.) performed by the internal diagnostic apparatus. |
| Diagnostic result | indicates a result of the diagnostic procedure performed by the internal diagnostic apparatus |

The internal diagnostic apparatus may transmit the diagnostic response message (S709). The diagnostic response message may be transmitted in a broadcast manner. The gateway (or, the external diagnostic apparatus) may receive the diagnostic response message from the internal diagnostic apparatus, and confirm the information elements included in the diagnostic response message. The diagnostic procedure of the external diagnostic apparatus may be performed after the diagnostic response message is received.

2) A case that the diagnostic initiation message includes the information elements listed in Table 2

Upon receiving the diagnostic initiation message, the internal diagnostic apparatus may compare the identifier indicated by the diagnostic initiation message with the identifier of the target end node. In case that the identifier indicated by the diagnostic initiation message is different from the identifier of the target end node, the internal diagnostic device may perform the diagnostic procedure for the target end node regardless of the diagnostic procedure of the external diagnostic apparatus. In case that the identifier indicated by the diagnostic initiation message is identical to the identifier of the target end node, the internal diagnostic apparatus may compare the diagnostic time (i.e., the start time of the diagnostic procedure of the external diagnostic apparatus) indicated by the diagnostic initiation message and a completion time of its diagnostic procedure (i.e., the completion time of the diagnostic procedure of the internal diagnostic apparatus). If the start time of the diagnostic procedure of the external diagnostic apparatus is after the completion of the diagnostic procedure of the internal diagnostic apparatus, the internal diagnostic apparatus may perform the diagnostic procedure for the target end node regardless of the diagnostic procedure of the external diagnostic apparatus.

On the other hand, if the start time of the diagnostic procedure of the external diagnostic apparatus is before the completion of the diagnostic procedure of the internal diagnostic apparatus, the internal diagnostic apparatus may stop the diagnostic procedure for the target end node if it is possible to stop its diagnostic procedure for the target end node. If it is impossible to stop its diagnostic procedure for the target end node, the internal diagnostic apparatus may generate a negative response message indicating that it is impossible to stop the diagnostic procedure of the internal diagnostic apparatus (S705). For example, the internal diagnostic apparatus may determine that it is impossible to stop its diagnostic procedure for the target end node when a software update procedure for the target end node is performed. The negative response message may include at least one information element among the information elements listed in Table 3 above.

The internal diagnostic apparatus may transmit the negative response message (S706). The negative response message may be transmitted in a broadcast manner, and may be transmitted periodically until completion of the diagnostic procedure performed by the internal diagnostic apparatus. The gateway (or, the external diagnostic apparatus) may receive the negative response message, and the diagnostic procedure of the external diagnostic apparatus may be performed in consideration of the information elements included in the negative response message (S707). For example, the external diagnostic apparatus may perform diagnostic procedures for end nodes other than the target end node indicated by the identifier included in the negative response message. Alternatively, the external diagnostic apparatus may perform the diagnostic procedure after a time indicated by the remaining time included in the negative response message. Alternatively, the external diagnostic apparatus may not perform the diagnostic procedure if the negative response message is received, and may perform the diagnostic procedure if the negative response message is not received for a predetermined time.

On the other hand, if the diagnostic procedure for the target end node is stopped or the diagnostic procedure for the target end node is completed, the internal diagnostic apparatus may generate a diagnostic response message (S708). The diagnostic response message may indicate that the diagnostic procedure by the internal diagnostic apparatus is stopped or that the diagnostic procedure by the internal diagnostic apparatus is completed. The diagnostic response message may include at least one information element among the information elements listed in Table 4 above. The internal diagnostic apparatus may transmit a diagnostic response message (S709). The diagnostic response message may be transmitted in a broadcast manner. The gateway (or, the external diagnostic apparatus) may receive the diagnostic response message from the internal diagnostic apparatus, and confirm the information elements included in the diagnostic response message. The diagnostic procedure of the external diagnostic apparatus may be performed after the diagnostic response message is received.

FIG. 8 is a flowchart for explaining a second embodiment of a method performed in the vehicle network shown in FIG. 6 to prevent a collision between diagnostic procedures.

Referring to FIG. 8, a gateway may be the gateway 600 shown in FIG. 6, and an external diagnostic apparatus may be connected to the gateway 600. In case that the method is applied to Scenario 2 of Table 1, a target end node may be one of the end nodes 631, 632, and 633 belonging to the CAN-based vehicle network shown in FIG. 6, and an internal diagnostic apparatus may be one of the end nodes 611, 612, 621, and 622 belonging to the Ethernet-based vehicle network shown in FIG. 6. In case that the method is applied to Scenario 3 of Table 1, the target end node may be one of the end nodes 611, 612, 621, and 622 belonging to the Ethernet-based vehicle network shown in FIG. 6, and the internal diagnostic apparatus may be one of the end nodes 631, 632, and 633 belonging to the CAN-based vehicle network shown in FIG. 6. In case that the method is applied to Scenario 4 of Table 1, the target end node may be one of the end nodes 631, 632, and 633 belonging to the CAN-based vehicle network shown in FIG. 6, and the internal diagnostic apparatus may be an end node other than the end node set as the target end node among the end nodes 631, 632, and 633 belonging to the CAN-based vehicle network shown in FIG. 6.

The internal diagnostic apparatus may perform a diagnostic procedure for the target end node (S801). The external diagnostic apparatus may be connected to the gateway while the diagnostic procedure is performed between the internal diagnostic apparatus and the target end node. In this case, the gateway (or, the external diagnostic apparatus) may generate a diagnostic initiation message indicating that the diagnostic procedure by the external diagnostic apparatus is to be performed (S802). The diagnostic initiation message may include at least one information element among the information elements listed in Table 2 above.

The gateway may transmit the diagnostic initiation message in a broadcast manner (S803). The diagnostic initiation message may thus be transmitted to all the communication nodes belonging to the vehicle network. The internal diagnostic apparatus may receive the diagnosis initiation message and confirm that the diagnostic procedure of the external diagnostic apparatus is to be performed based on the received diagnostic initiation message. Accordingly, in order to prevent a collision between the diagnostic procedure of the internal diagnostic apparatus and the diagnostic procedure of the external diagnostic apparatus, the internal diagnostic apparatus may stop its diagnostic procedure for the target end node (S804).

Meanwhile, if the diagnostic procedure for the target end node is stopped, the internal diagnostic apparatus may generate a diagnostic response message (S805). The diagnostic response message may indicate that the diagnostic procedure by the internal diagnostic apparatus is stopped. The diagnostic response message may include at least one information element among the information elements described in Table 4. The internal diagnostic apparatus may transmit the diagnostic response message (S806). The diagnostic response message may be transmitted in a broadcast manner. The gateway (or, the external diagnostic apparatus) may receive the diagnostic response message from the internal diagnostic apparatus, and confirm the information elements included in the diagnostic response message. If a negative response message is not received in response to the diagnostic initiation message, or if the diagnostic response message is received from the internal diagnostic apparatus, the external diagnostic apparatus may perform the diagnostic procedure.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A diagnostic method performed by a first communication node in a vehicle network including a plurality of communication nodes, the diagnostic method comprising:
    performing, by the first communication node, an internal diagnostic procedure with a second communication node, operating as an internal diagnostic apparatus, among the plurality of communication nodes;
    receiving, by the first communication node, a diagnostic initiation message from an external diagnostic apparatus which is located out of the vehicle network, the diagnostic initiation message indicating that an external diagnostic procedure of the first communication node is to be performed;
    transmitting, by the first communication node, in a broadcast manner, a diagnostic initiation message;
    receiving, by the first communication node, a negative response message as a response to the diagnostic initiation message from the second communication node; and
    when the negative response message indicates that the internal diagnostic procedure by the second communication node cannot be stopped, performing, by the first communication node, the external diagnostic procedure with the external diagnostic apparatus after the internal diagnostic procedure by the second communication node is completed, and
    wherein the transmission of the diagnostic initiation message and the reception of the negative response message are performed to prevent a collision between the external diagnostic procedure and the internal diagnostic procedure.

2. The diagnostic method according to claim 1, wherein the external diagnostic procedure is performed after a time indicated by the negative response message.

3. The diagnostic method according to claim 1, wherein the diagnostic initiation message includes an indicator indicating that the external diagnostic procedure is to be performed, at least one identifier of at least one communication node, among the plurality of communication nodes, for which the external diagnostic procedure is to be performed, and information indicating a start time of the external diagnostic procedure.

4. The diagnostic method according to claim 1, wherein the negative response message includes an identifier of a third communication node, among the plurality of communication nodes, diagnosed through the internal diagnostic procedure, and information indicating a remaining time until completion of the internal diagnostic procedure.

5. The diagnostic method according to claim 4, wherein the vehicle network includes an Ethernet-based vehicle network and a controller area network (CAN) based vehicle network, and the second communication node and the third communication node belong to the Ethernet-based vehicle network.

6. The diagnostic method according to claim 4, wherein the vehicle network includes an Ethernet-based vehicle network and a controller area network (CAN) based vehicle network, the negative response message is not received when the second communication node belongs to the Ethernet-based vehicle network and the third communication node belongs to the CAN-based vehicle network, or when the second communication node belongs to the CAN-based vehicle network and the third communication node belongs to the Ethernet-based vehicle network or the CAN-based vehicle network, and the external diagnostic procedure is performed when the negative response message is not received for a predetermined time.

7. The diagnostic method according to claim 2, wherein the external diagnostic procedure is performed after receiving a diagnostic response message indicating that the internal diagnostic procedure of the second communication node is completed.

8. The diagnostic method according to claim 7, wherein the diagnostic response message includes an identifier of a third communication node diagnosed through the internal diagnostic procedure, a type of the internal diagnostic procedure, and a result of the internal diagnostic procedure.

9. A diagnostic method performed by a first communication node operating as an internal diagnostic apparatus in a vehicle network including a plurality of communication nodes, the diagnostic method comprising:
- performing, by the first communication node, an internal diagnostic procedure for a second communication node among the plurality of communication nodes;
- receiving, by the first communication node, a diagnostic initiation message indicating that an external diagnostic procedure by an external diagnostic apparatus is to be performed from a third communication node to which the external diagnostic apparatus is connected, among the plurality of communication nodes;
- when the diagnostic initiation message indicates that the external diagnostic procedure by the second communication node is to be performed, determining, by the first communication node, whether to stop the internal diagnostic procedure with the second communication node based on the diagnostic initiation message; and
- in response to a determination that the internal diagnostic procedure cannot be stopped, transmitting, by the first communication node, a negative response message indicating that the internal diagnostic procedure cannot be stopped,
- wherein the external diagnostic procedure is performed after the internal diagnostic procedure is completed, and
- wherein the transmission of the diagnostic initiation message and the reception of the negative response message are performed to prevent a collision between the internal diagnostic procedure and the external diagnostic procedure.

10. The diagnostic method according to claim 9, wherein the diagnostic initiation message includes an indicator indicating that the external diagnostic procedure is to be performed, at least one identifier of at least one communication node, among the plurality of communication nodes, diagnosed through the external diagnostic procedure, and information indicating a start time of the external diagnostic procedure.

11. The diagnostic method according to claim 10, wherein the internal diagnostic procedure is performed regardless of the external diagnostic procedure in response to a determination that an identifier of the second communication node is different from the at least one identifier included in the diagnostic initiation message, and the negative response message is transmitted in response to a determination that the identifier of the second communication node is identical to the at least one identifier included in the diagnostic initiation message and the internal diagnostic procedure cannot be stopped.

12. The diagnostic method according to claim 10, wherein the internal diagnostic procedure is performed regardless of the external diagnostic procedure in response to a determination that a completion time of the internal diagnostic procedure is before the start time of the external diagnostic procedure indicated by the diagnostic initiation message, and the negative response message is transmitted in response to a determination that the completion time of the internal diagnostic procedure is after the start time of the external diagnostic procedure indicated by the diagnostic initiation message and the internal diagnostic procedure cannot be stopped.

13. The diagnostic method according to claim 9, wherein the negative response message includes an identifier of the second communication node diagnosed through the internal diagnostic procedure, and information indicating a remaining time until completion of the internal diagnostic procedure.

14. The diagnostic method according to claim 9, wherein the vehicle network includes an Ethernet-based vehicle network and a controller area network (CAN) based vehicle network, and the first communication node and the second communication node belong to the Ethernet-based vehicle network.

15. The diagnostic method according to claim 9, further comprising transmitting, by the first communication node, a diagnostic response message indicating that the internal diagnostic procedure is completed when the internal diagnostic procedure is completed.

16. A first communication node operating as an internal diagnostic apparatus in a vehicle network including a plurality of communication nodes, comprising a processor and a memory storing at least one instruction executed by the processor, wherein the at least one instruction is configured to:
- perform an internal diagnostic procedure for a second communication node among the plurality of communication nodes;
- receive a diagnostic initiation message indicating that an external diagnostic procedure by an external diagnostic apparatus is to be performed from a third communication node to which the external diagnostic apparatus is connected, among the plurality of communication nodes;
- when the diagnostic initiation message indicates that the external diagnostic procedure by the second communication node is to be performed, determine whether to stop the internal diagnostic procedure with the second communication node based on the diagnostic initiation message; and
- in response to a determination that the internal diagnostic procedure cannot be stopped, transmit a negative response message indicating that the internal diagnostic procedure cannot be stopped,
- wherein the external diagnostic procedure is performed after the internal diagnostic procedure is completed, and
- wherein the transmission of the diagnostic initiation message and the reception of the negative response message are performed to prevent a collision between the internal diagnostic procedure and the external diagnostic procedure.

17. The first communication node according to claim 16, wherein the diagnostic initiation message includes an indicator indicating that the external diagnostic procedure is to be performed, at least one identifier of at least one communication node, among the plurality of communication nodes, diagnosed through the external diagnostic procedure, and information indicating a start time of the external diagnostic procedure.

18. The first communication node according to claim 17, wherein the at least one instruction executed by the processor causes the processor to perform the internal diagnostic procedure regardless of the external diagnostic procedure in response to a determination that an identifier of the second communication node is different from the at least one identifier included in the diagnostic initiation message.

19. The first communication node according to claim 17, wherein the at least one instruction executed by the processor causes the processor to perform the internal diagnostic procedure regardless of the external diagnostic procedure in response to a determination that a completion time of the internal diagnostic procedure is before the start time of the external diagnostic procedure indicated by the diagnostic initiation message.

20. The first communication node according to claim 16, wherein the negative response message includes an identifier of the second communication node diagnosed through the internal diagnostic procedure, and information indicating a remaining time until completion of the internal diagnostic procedure.

21. The first communication node according to claim 16, wherein the vehicle network includes an Ethernet-based vehicle network and a controller area network (CAN) based vehicle network, and the first communication node and the second communication node belong to the Ethernet-based vehicle network.

* * * * *